Patented May 27, 1952

UNITED STATES PATENT OFFICE 2,598,402

2,598,402

POLYSILOXANE RESINS WITH LEAD TETRAPHENYL CATALYST

Glennard R. Lucas, Pittsfield, Mass., assignor to General Electric Company, a corporation of New York No Drawing. Application October 3, 1950, Serial No. 188,267

8 Claims. (Cl. 260—46.5)

The present invention relates to polysiloxane resins, that is, heat-hardenable organopolysiloxanes containing more than one and less than two, preferably from about 1.1 to 1.7 hydrocarbon radicals attached to silicon atoms. It is particularly concerned with compositions containing polysiloxane resin as the resinous component thereof and a curing catalyst for said resin comprising a minor proportion of tetraphenyl lead.

Polysiloxane resins of the type with which the present invention is concerned are described, for example, in U. S. Patents 2,258,218–222 of Eugene G. Rochow. These resins comprise a plurality of hydrocarbon-substituted silicon atoms linked by oxygen atoms and are prepared, for example, by hydrolysis and condensation of a mixture of organosilicon halides. The commercially used products containing an average of more than 1.0 and less than 2 hydrocarbon radicals per silicon atom (e. g., from 1.1 to 1.5 hydrocarbon radicals per silicon atom) are soluble and are converted to a highly insoluble state when heated for comparatively long periods of time at fairly elevated temperatures. Additional examples of resins coming within the scope of the present invention may be found, for example, is Welsh Patent 2,449,572 issued September 21, 1948 and assigned to the same assignee as the present invention.

Many cure accelerators have been suggested for effecting conversion of organopolysiloxane resins to the insoluble and infusible state. The above-identified Welsh Patent 2,449,572 discloses a class of cure accelerators for silicone resins comprising a metal salt of an organic acid soluble in the resin. Among such salts disclosed in the said Welsh patent are, for instance, lead naphthenate, iron naphthenate, cobalt naphthenate, as well as other metallic salts of organic acids. However, great difficulty has been found in using this class of cure accelerators since upon incorporation of these metallic salts of organic acids in the organopolysiloxane resin (for brevity hereinafter referred to as the "silicone" resin), the shelf life of the resin is markedly reduced. By this is meant that after incorporation of the metallic salt in the resin, upon standing even at room temperatures, after short periods of time, for example, after periods of from one to two days, the resin tends to advance rapidly to the insoluble and infusible state so that, after a short period of time, the resin gels and becomes worthless. In addition, it has been found that despite the fact that there is a tendency of the resin to gel at room temperature, rather long molding times are required to convert the mixture of the resin with the metallic salts during molding at elevated temperatures.

The present invention is based on the discovery that small amounts of lead tetraphenyl catalyze the cure of heat-hardenable polysiloxane resins so that the polysiloxane resins containing these catalysts can be cured to a solid state in much shorter time and at lower temperatures than uncatalyzed resins, and even in a shorter time and at lower temperatures than resins in which the usual cure accelerators are employed as, for example, the metallic salts described in the above-mentioned Welsh patent. In addition, I have found that one can incorporate the lead tetraphenyl in this organopolysiloxane resin prior to any molding operation and permit the cure accelerator to remain in the resin for extended periods of time without causing any undue or undesirable advancement of the resin to the insoluble and infusible state or gelling of the resin.

The fact that lead tetraphenyl possessed all the above described desirable characteristics was entirely unexpected and in no way could have been predicted since other metallo-organic cure accelerators, for example, tin tetraphenyl, mercury diphenyl, mercury ditolyl, and bismuth triphenyl were nowhere near as effective in accelerating the cure at elevated temperatures. It was also found that a similar lead compound, namely, lead tetraethyl was not equivalent to the lead tetraphenyl as a cure accelerator although the lead tetraethyl in some respects did show delayed action with regard to gelation of the resin at room temperature when permitted to stand around.

Solution of the lead tetraphenyl can be effected in a wide variety of solvents including aliphatic and aromatic hydrocarbons, ethers, esters, ketones, and alcohols. In fact, no solvent has been found which appears to affect the catalytic activities of the lead tetraphenyl. The relative catalytic activity of the lead tetraphenyl also appears to be independent of the type of polysiloxane resin treated therewith.

While the rate of cure of polysiloxane resins is dependent upon the amount of lead tetraphenyl added to the resin, no advantage has been found in using the catalyst in concentrations exceeding about 2%, by weight, of the catalyst based on the weight of the resin. In general, the amount of catalyst employed for accelerating the cure of the polysiloxane resin will be less than one-half per cent, usually about 0.1%, by weight, of the catalyst based on the weight of the resin. For example, as little as 0.0015% lead tetraphenyl has been found sufficient to effect conversion of the hydrocarbon-substituted polysiloxane resins containing in the neighborhood of from about 1 to 1.5 methyl or equivalent hydrocarbon radicals per silicon atom.

In order that those skilled in the art may better understand how the present invention may be practiced, the following examples are given by way of illustration and not by way of limitation.

Example 1

In this example an organopolysiloxane resin was prepared by cohydrolyzing a mixture of methyltrichlorosilane and dimethyldichlorosilane to give a resinous composition having a ratio of approximately 1.3 methyl groups per silicon atom. This resin was dissolved in an aromatic solvent, specifically toluene, to about a 60% solids solution. Samples of this silicone varnish were weighed into tared aluminum cups. To one cup was added 0.1%, by weight, lead tetraphenyl (based on the weight of the dried resin) and to another sample in the aluminum cup was weighed a similar amount of lead naphthenate. Both the lead tetraphenyl and lead naphthenate were added in the form of a toluene solution. Both cups were then dried overnight at room temperature and heated in a circulating oven at 100° C. for an hour in order to remove substantially all the toluene from the varnish. As a control, a similar sample of varnish was dried in an aluminum cup omitting any catalyst. At the end of one hour it was found that whereas the control sample and the sample containing the lead tetraphenyl were completely liquid and completely soluble in various solvents, in contrast to this the sample containing the lead naphthenate was badly gelled. Moreover, it was found on further testing that heat aging the various samples resulted in a faster, more complete cure in the case of the lead tetraphenyl catalyst than was possible with the lead naphthenate. The control sample, of course, had not cured at all. The fact that the resin containing the lead tetraphenyl could be cured much more rapidly than the resin containing the lead naphthenate was entirely unexpected in view of the fact that at room temperature the lead naphthenate sample gelled much faster than the lead tetraphenyl sample.

Example 2

In this example a methyl phenyl silicone resin in which the average ratio of total methyl and phenyl groups per silicon atom was approximately 1.1 was mixed with 0.1% lead naphthenate, in one case, and in another case with 0.1% lead tetraphenyl, the per cents catalyst being based on the weight of the dry resin. Each of the samples was dried at room temperature for about eight hours and then heated in the circulating oven at 100° C. for one hour to remove the toluene solvent from the methylphenyl organopolysiloxane resinous varnish. In the case of the lead naphthenate as the cure accelerator, it was found that the resin had gelled badly during drying and was about 82% cured. In contrast to this, the sample containing the lead tetraphenyl was completely soluble when dried under the same conditions. When the two resinous samples were heated at 250° C. for extended periods of time, it was found that both resins had cured to about 98-99% of the possible cure as evidenced by the percent of extractable matter. It was found, however, that at earlier corresponding times at the 250° C. temperature, the resin catalyzed with the lead tetraphenyl was more completely cured and contained less extractable material than the resin using the lead naphthenate as a cure accelerator. Of course, after fairly long periods of time the per cent cure and per cent non-extractable of the two resin samples became essentially the same. However, the tests on these two samples indicated that it would be possible to keep a resinous sample with the lead tetraphenyl catalyst at room temperature for extended periods of time without danger of gelling or setting up the resin, and that when such resin was used for molding purposes it would cure faster than and as thoroughly as a similar resin using lead naphthenate as the cure accelerator.

Example 3

In this example samples were made up using the resin described in Example 2 above. In one case, one sample of the resin in a toluene solvent was mixed with 0.1% lead tetraphenyl (based on the weight of the dry resin) and in another case 0.1% lead tetraethyl (based on the weight of the dry resin) was added to the methyl phenyl polysiloxane resin. The samples were dried at room temperature and then were further dried for two hours at 105° C. to remove the solvent. Thereafter, the samples were heated at 150° C. for varying lengths of time and the per cent non-extractable material (using acetone as the extracting agent) from the respective samples was determined to show the degree of cure at 150° C. at any particular time. In the case of the use of lead tetraphenyl, it was found that the resin was about 54% non-extractable after only 18 minutes at 150° C. and was about 79% non-extractable after only about 37 minutes at 150° C. In contrast to this, after 18 minutes the sample containing lead tetraethyl contained only 23% non-extractable meterial, after 30 minutes it was about 36% non-extractable matter and after about 66 minutes at 150° C. contained only about 70% non-extractable material. The foregoing tests clearly indicate the marked advantage in using the tetraphenyl lead over the tetraethyl lead. More particularly, by the use of the tetraphenyl lead it is possible to mold products faster and get more complete cures in shorter periods of time than when using, for example, a catalyst such as lead tetraethyl.

The use of the lead tetraphenyl is a marked advance in the catalytic treatment of silicone resins since it shows no activity toward the latter at low temperatures, yet cures the resin rapidly and completely at elevated temperatures. The lead tetraphenyl has good solubility in the resin or varnish due to the presence of the organic substituents, which also prevent catalytic action of the metal itself because the coordinating valences of the metal are blocked or tied up by the organic substituents. Up to the temperature of oxidation or rupture of the phenyl groups away from the metallic group, catalyst action is therefore absent. When heated or otherwise decomposed the lead tetraphenyl exhibits unexpectedly strong catalytic action as is shown above in the foregoing examples. The lead tetraphenyl has the further advantage in that it imparts a very rapid and complete cure to the heated resin and in this respect is superior to other cure accelerators including other lead compounds. Complete cure of the resin is necessary in order to obtain good solvent resistance of molded and laminated parts. Moreover, the presence of such a rearranging catalyst as the lead tetraphenyl helps to relieve strains in the molded part and to obtain the maximum strength characteristics of the latter. The weight losses during cure which result at least in part to exposure of the uncured resin for long periods of time to elevated temperatures are much less where the reaction is rapid and complete. Therefore, the tendency to develop crazing during baking is reduced.

It will, of course, be apparent to those skilled in the art that instead of the particular organopolysiloxane resin employed in the examples above, other organopolysiloxane resins which are described in the aforementioned Rochow and Welsh patents may also be employed without departing from the scope of the invention. In addition, larger or smaller amounts of lead tetraphenyl based on the weight of the resin may also be used, and amounts as high as, for example, 2 to 5% or more are not precluded. However, as pointed out previously, larger amounts are not necessary since the smaller amounts are adequate for many of the purposes.

Polysiloxane resins or varnishes containing fractions of a per cent of the lead tetraphenyl may be used for many insulating purposes requiring low power factors and good heat resistance. For example, the catalyzed resins may be combined with paper, glass cloth, cotton cloth, or other sheet material and the resultant material employed as a condenser dielectric, wire and cable insulation, etc. The catalyzed resins in themselves may be used in the manufacture of enameled wire without the necessity of using high baking temperatures. As varnishes for filling and treating coils, advantage can be taken of the fact that the catalyst promotes the thorough curing of thick sections of the resins in the absence of air.

The catalyzed resins may be used to advantage as bases for enamels, particularly white or light colored enamels. Methyl phenylpolysiloxanes are preferred for this application because of their faster cure, hardness, high gloss, and freedom from discoloration at elevated temperatures. It will, of course, be apparent that many enamel pigments, e. g., titanium oxide, iron oxide, lithopone, calcium carbonate, can be used with the resins.

While the invention has been described with particular reference to methyl and methyl phenyl polysiloxane resins, it is to be understood that it is broadly applicable that any soluble polysiloxane resin in which the hydrocarbon radicals attached to silicon atoms are selected from the group consisting of, for instance, alkyl (e. g., methyl, ethyl, propyl, etc.), aryl (phenyl, naphthyl, etc.), alkaryl (e. g., tolyl, xylyl, etc.), aralkyl (e. g., benzyl, phenylethyl, etc.) radicals. Such resin may contain two or more different radicals attached to silicon as is the case with the methyl phenyl resins described above, or the organic groups may have substituents thereon as, for example, halogens, etc. All these resins may be made into solutions in common solvents such as toluene, xylene, benzene, mixtures of toluene and butanol, petroleum spirits, etc.

What I claim as new and desire to secure by Letters Patent of the United States is:

1. A composition of matter comprising a heat-hardenable organopolysiloxane resin containing an average of from 1.1 to 1.7 organic groups per silicon atom, the aforesaid organic groups being attached to the silicon atoms of the organopolysiloxane by carbon–silicon linkages, and a curing catalyst for said resin comprising a small amount of lead tetraphenyl.

2. A composition of matter comprising a hydrocarbon-substituted polysiloxane resin containing an average of from 1.1 to 1.5 hydrocarbon radicals per silicon atom, the said hydrocarbon radicals being attached to the silicon atoms of the polysiloxane by carbon–silicon linkages, and as a curing catalyst for said resin comprising a small amount of tetraphenyl lead.

3. A composition of matter comprising an alkyl polysiloxane resin containing an average of from 1.1 to 1.5 alkyl groups per silicon atom, the said alkyl groups being attached to the silicon atoms of the alkyl polysiloxane by carbon-silicon linkages, a solvent for said resin, and as a curing catalyst for said resin an amount up to 2%, by weight, of tetraphenyl lead, based on the weight of the resin.

4. A composition of matter comprising a heat-hardenable methyl phenyl polysiloxane resin in which the average ratio of total methyl and phenyl groups per silicon atom is from 1.1 to 1.7, the said methyl and phenyl groups being attached to the silicon atoms of the polysiloxane by carbon-silicon linkages, and as a curing catalyst for said resin a small amount up to about 2% of tetraphenyl lead, based on the weight of the resin.

5. A composition of matter comprising a methyl polysiloxane resin wherein is contained an average of from about 1.1 to 1.5 methyl groups per silicon atom, the said methyl groups being attached to the silicon atoms of the methyl polysiloxane by carbon-silicon linkages, and a curing catalyst for said resin comprising tetraphenyl lead in an amount corresponding to not more than 2%, by weight, based on the weight of the resin.

6. The method which comprises incorporating a minor proportion of lead tetraphenyl in a resinous organopolysiloxane in which the ratio of organic groups to silicon atoms is from 1.1 to 1.7, the organic groups in the aforesaid organopolysiloxane being attached to the silicon atoms thereof by carbon-silicon linkages, and thereafter heating the mixture until the organopolysiloxane is substantially infusible and insoluble.

7. The method which comprises incorporating a minor proportion of lead tetraphenyl in a resinous methylpolysiloxane in which the ratio of methyl groups to silicon atoms is from 1.1 to 1.7, the methyl radicals of the aforesaid methylpolysiloxane being attached to the silicon atoms of the latter by carbon-silicon linkages, and thereafter heating the mixture until the methylpolysiloxane is substantially infusible and insoluble.

8. The method which comprises incorporating a minor proportion of lead tetraphenyl in a resinous methyl and phenyl-substituted polysiloxane containing an average of from 1.1 to 1.7 total methyl phenyl groups per silicon atom, the methyl and phenyl groups of the aforesaid polysiloxane being attached to the silicon atoms of the latter by carbon-silicon linkages, and thereafter heating the mixture until the aforesaid polysiloxane is substantially infusible and insoluble.

GLENNARD R. LUCAS.

REFERENCES CITED

The following references are of record in the file of this patent:

UNITED STATES PATENTS

| Number | Name | Date |
|---|---|---|
| 2,418,832 | Hanford | Apr. 15, 1947 |
| 2,449,572 | Welsh | Sept. 21, 1948 |
| 2,480,620 | Warrick | Aug. 30, 1949 |
| 2,516,047 | De Coste | July 18, 1950 |